US008584826B2

(12) United States Patent
Smith et al.

(10) Patent No.: US 8,584,826 B2
(45) Date of Patent: Nov. 19, 2013

(54) CONVEYOR SYSTEMS

(75) Inventors: Roger G. Smith, Lake Oswego, OR (US); Carl E. Batson, Mt. Angel, OR (US)

(73) Assignee: Construction Equipment Company, Tualatin, OR (US)

( * ) Notice: Subject to any disclaimer, the term of this patent is extended or adjusted under 35 U.S.C. 154(b) by 141 days.

(21) Appl. No.: 12/869,093

(22) Filed: Aug. 26, 2010

(65) Prior Publication Data

US 2012/0048674 A1 Mar. 1, 2012

(51) Int. Cl.
*B65G 41/00* (2006.01)

(52) U.S. Cl.
USPC .......................... 198/302; 198/313; 198/632

(58) Field of Classification Search
USPC .................. 198/302, 303, 306, 313, 312, 632
See application file for complete search history.

(56) References Cited

U.S. PATENT DOCUMENTS

| | | | | |
|---|---|---|---|---|
| 3,444,987 A * | 5/1969 | Palmer | | 198/301 |
| 4,135,614 A * | 1/1979 | Penterman et al. | | 198/306 |
| 4,202,422 A * | 5/1980 | McLean | | 180/6.48 |
| 4,469,191 A * | 9/1984 | Truninger | | 180/233 |
| 4,726,459 A * | 2/1988 | Vos | | 198/306 |
| 5,390,777 A | 2/1995 | Gage | | |
| 5,515,961 A * | 5/1996 | Murphy et al. | | 198/302 |
| 5,833,043 A * | 11/1998 | Schmidgall et al. | | 198/302 |
| 6,186,311 B1 * | 2/2001 | Conner | | 198/300 |
| 6,296,109 B1 * | 10/2001 | Nohl | | 198/632 |
| 6,360,876 B1 | 3/2002 | Nohl et al. | | |
| 6,929,113 B1 * | 8/2005 | Hoover et al. | | 198/812 |
| 7,264,190 B2 | 9/2007 | Smith et al. | | |
| 7,284,947 B1 | 10/2007 | Felton | | |
| 7,296,676 B2 | 11/2007 | Smith et al. | | |
| 7,500,566 B2 | 3/2009 | Smith et al. | | |
| 2004/0031662 A1 * | 2/2004 | Jacoba Dekoning | | 198/313 |
| 2006/0244234 A1 * | 11/2006 | Ramsey | | 280/124.131 |
| 2007/0029170 A1 | 2/2007 | Anagnost | | |
| 2008/0101910 A1 | 5/2008 | Felton | | |
| 2008/0116039 A1 | 5/2008 | Ainsworth | | |
| 2009/0145721 A1 * | 6/2009 | Toews | | 198/300 |

* cited by examiner

*Primary Examiner* — Gene Crawford
*Assistant Examiner* — Keith R Campbell
(74) *Attorney, Agent, or Firm* — Schwabe, Williamson & Wyatt, P.C.

(57) ABSTRACT

A system for conveying material is disclosed. The system may include a base assembly including at least one proximal leg movably, and a plurality of wheels configured to move between a transport position in which the plurality of wheels is adjacent to the base, and a working position in which the plurality of wheels is spaced from the base relative to the transport position, wherein the at least one proximal leg is configured to move between a retracted position in which the plurality of wheels supports the system on a ground surface, and an extended position in which the at least one proximal leg supports the system on the ground surface and at least one wheel of the plurality of wheels does not support the system on the ground surface; a conveying assembly; and a support assembly configured to move the conveying assembly between storage and operating positions.

7 Claims, 4 Drawing Sheets

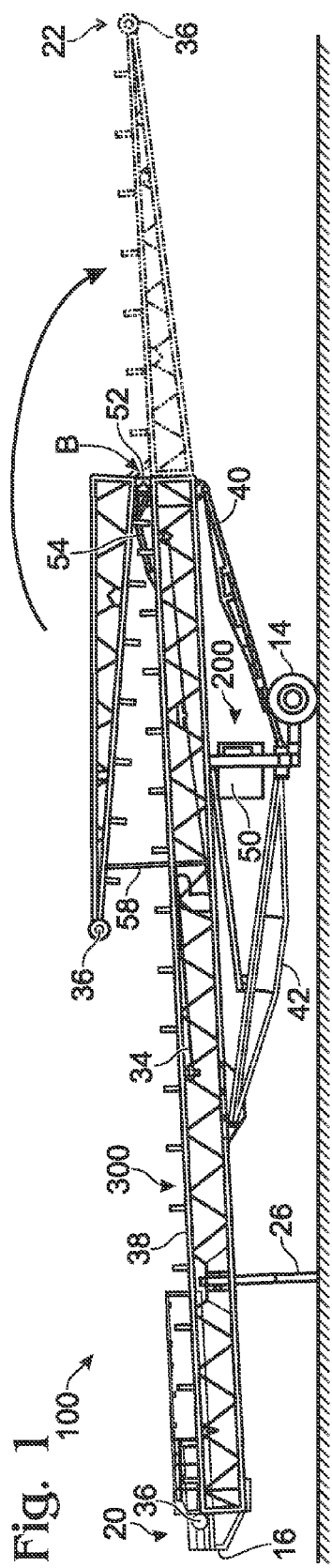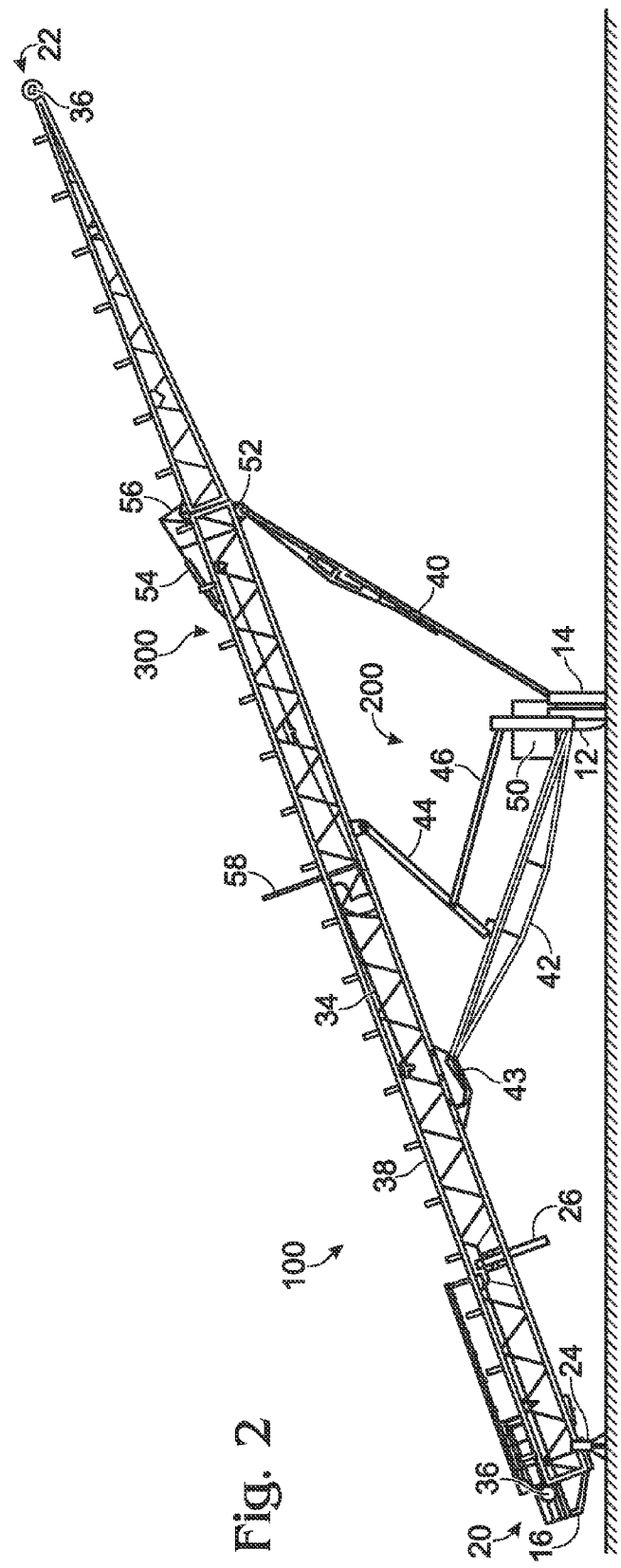

CONVEYOR SYSTEMS

TECHNICAL FIELD

Embodiments herein relate to the field of excavation, for instance systems for processing dirt and debris, and more specifically, to conveyor systems for processing dirt and/or debris mixtures.

BACKGROUND

Various systems are used for processing dirt and/or debris mixtures, which may include rocks, concrete pieces, wood pieces, stones, discarded hardware, and other types of dirt and/or debris. That processing may include conveying material to create or form one or more stockpiles. Systems may form any suitable type of stockpiles, such as circular stockpiles, radial stockpiles, etc. Examples of systems for processing dirt and/or debris mixtures, including systems that convey material to create one or more stockpiles, are illustrated in U.S. Pat. Nos. 4,135,614; 5,390,777; 5,515,961; 5,833,043; 6,360,876; 7,284,947; and U.S. Patent Application Publication Nos. 2007/0029170 and 2008/0101910. The complete disclosures of those patents and patent applications are herein incorporated by reference for all purposes.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1 is a side view of a conveyor system in a storage and/or transport position, in accordance with various embodiments;

FIG. 2 is a side view of the conveyor system of FIG. 1 in an inclined position, in accordance with various embodiments;

DETAILED DESCRIPTION OF DISCLOSED EMBODIMENTS

Figure 3:
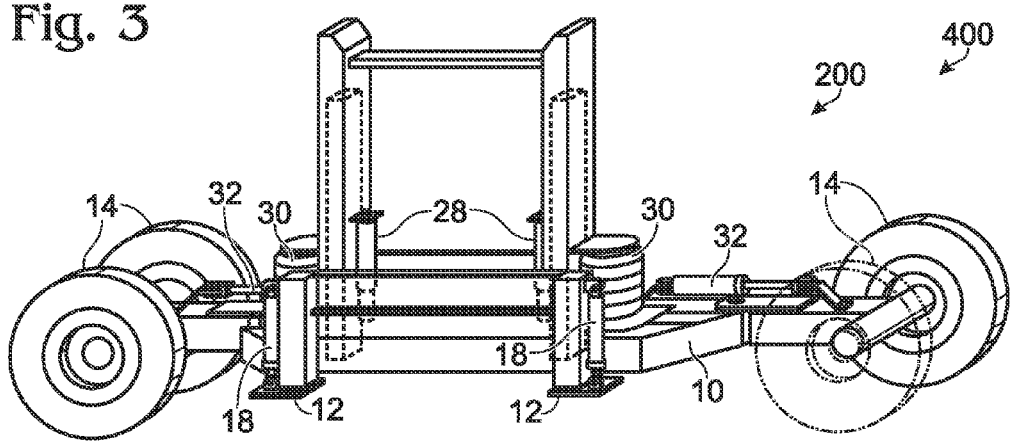
FIG. 3 is a front view of a base assembly of the conveyor system of FIG. 1, in accordance with various embodiments.

In the following detailed description, reference is made to the accompanying drawings which form a part hereof, and in which are shown by way of illustration embodiments that may be practiced. It is to be understood that other embodiments may be utilized, and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments of the present disclosure may include systems for conveying bulk material, for instance dirt, rocks, debris, aggregate, sand, coal, wood chips, grain, and similar materials. FIG. 1 illustrates a side view of an exemplary conveyor system 100 in a storage and/or transport position, and FIG. 2 illustrates a side view of the exemplary conveyor system 100 of FIG. 1 in an inclined position. In various embodiments, conveyor system 100 may include a support assembly 200 for movably supporting conveyor system 100, and a conveyor assembly 300 for conveying bulk material from a feed inlet 20 to a discharge outlet 22.

In various embodiments, the opposite end of conveyor system 100 may be supported by wheels 14, for instance for movement over the ground. As described in greater detail below, wheels 14 may be configured to be movable between at least two orientations: generally parallel to the longitudinal axis of conveyor system 100 as illustrated in FIG. 1, or generally perpendicular to the longitudinal axis of conveyor system 100 as illustrated in FIG. 2. In various embodiments, the generally parallel wheel orientation illustrated in FIG. 1 may be used for transporting conveyor system 100, whereas the generally perpendicular wheel orientation illustrated in FIG. 2 may be used for radially orienting conveyor system 100 about pivot 24, for instance during use in conveying bulk material. In use, when wheels 14 are oriented generally perpendicular to the longitudinal axis of conveyor system 100 as illustrated in FIG. 2, conveyor system 100 generally may be rotated 360 degrees about pivot 24, which may allow conveyor system 100 to be maneuvered to any point in a full circle radius. In some embodiments, this pivoting may be driven by power source 50, which may be drivably coupled to wheels 14.

FIG. 3 illustrates a front view of support assembly 200 of an example of conveyor system 100. In various embodiments, conveyor system 100 may include support assembly 200, which may include any suitable structure configured to support one or more other components of conveyor system 100. In various embodiments, support assembly 200 may include a base 10, at least one proximal leg 12 movably connected to base 10, and one or more wheels 14 rotatably connected to base 10 and configured to move between a transport position (see, e.g., FIG. 1) in which the wheels 14 are adjacent to base 10 and generally parallel to a longitudinal axis of conveyor system 100, and a working position (see, e.g., FIG. 2) in which the wheels 14 are spaced from base 10 relative to the transport position and are generally perpendicular to the longitudinal axis of conveyor system 100.

Figure 6:
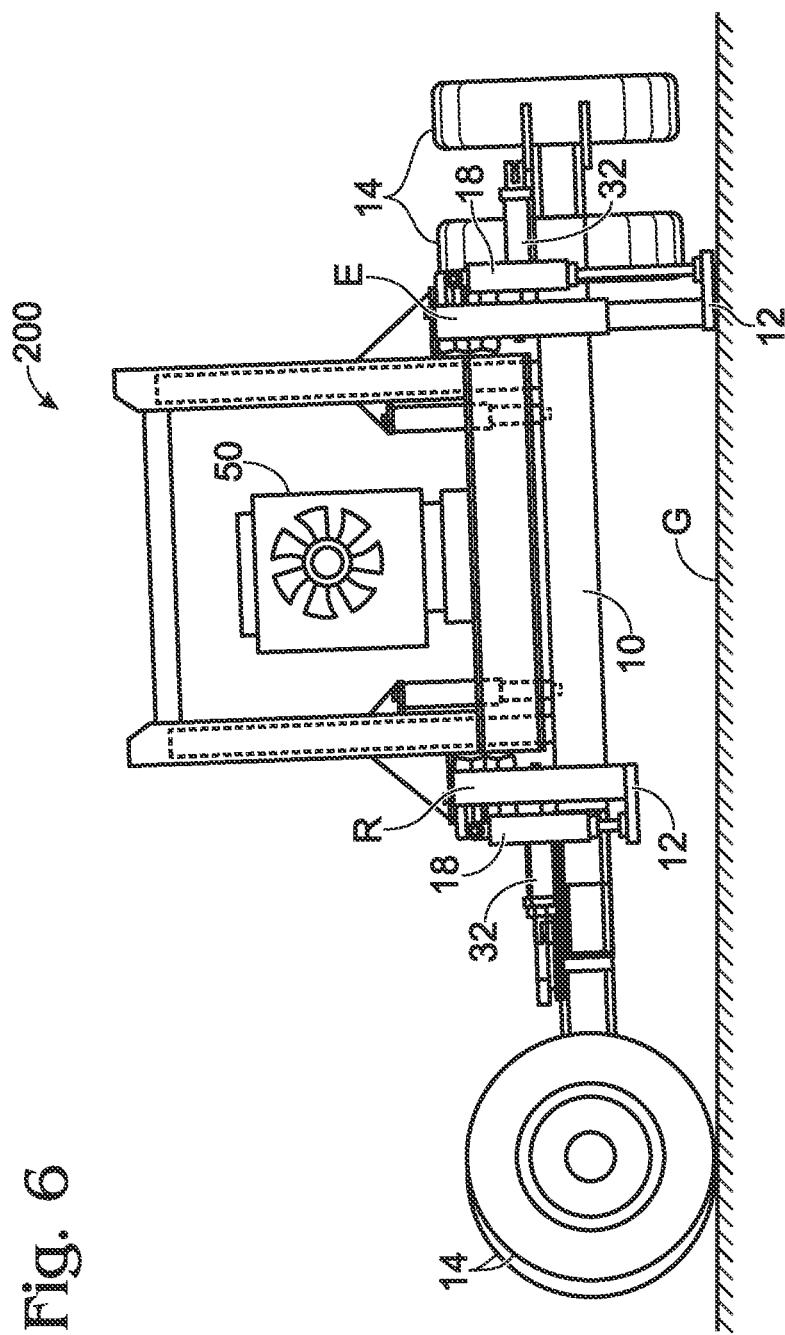
FIG. 6 is the base assembly of FIG. 3, shown with a leg in an extended position with wheels adjacent to the leg not supported on the ground surface, in accordance with various embodiments.

In various embodiments, one or more proximal legs 12 may be extended to support conveyor system 100 and lift one or more wheels 14 off the ground surface G so that wheels 14 may be moved between transport and working positions. FIG. 6 illustrates an embodiment of support assembly 200 with proximal leg 12 in an extended position with wheels 14 adjacent proximal leg 12 elevated above the ground surface G. In various embodiments, this may allow wheels 14 to be moved into a desired position. Once wheels 14 are in the desired position, proximal leg 12 may be retracted so that conveyor system 100 is supported by wheels 14 in their new position. In some embodiments, telescoping cylinders 32 may be provided to move wheels 14 into the desired position. In some examples, telescoping cylinders 32 may include or be coupled to a power source or motor.

Figure 7:
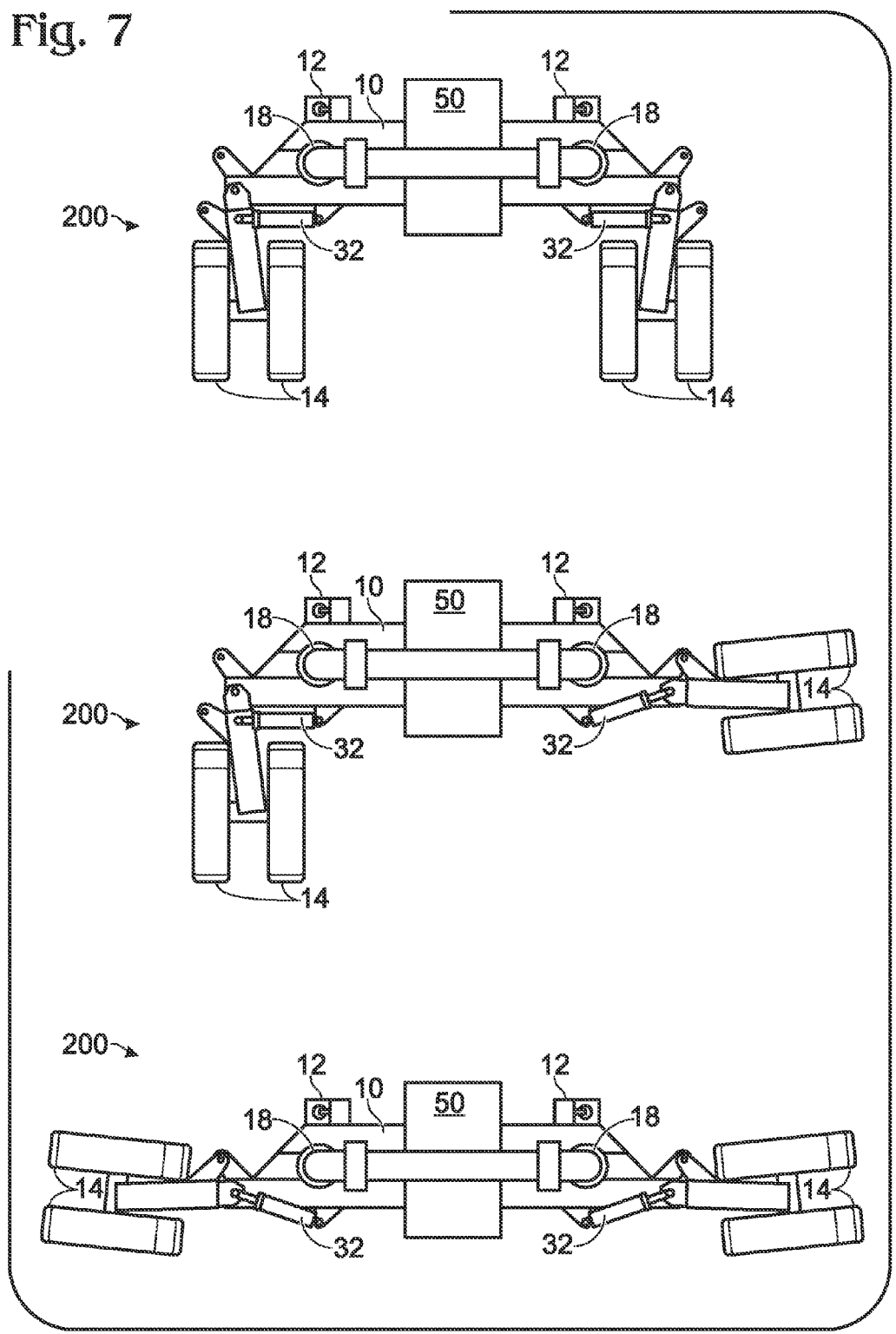
FIG. 7 is the base assembly of FIG. 6, shown with the wheels moving from adjacent to the leg in the transport position to spaced away from the leg in the working position, in accordance with various embodiments.

FIG. 7 illustrates an embodiment of support assembly 200 with wheels 14 moving from adjacent to proximal leg 12 in a transport position (e.g., generally parallel to the longitudinal axis of conveyor system 100) to spaced away from proximal leg 12 in a working position (e.g., generally perpendicular to the longitudinal axis of conveyor system 100). As shown, proximal leg 12 may be movably connected to base 10 and be configured to move among a plurality of positions, such as between a retracted position R in which proximal leg 12 does not support conveyor system 100 on a ground surface G and plurality of wheels 14 supports conveyor system 100 on the ground surface, and an extended position E in which proximal leg 12 supports conveyor system 100 on the ground surface and at least one wheel 14 of the plurality of wheels 14 does not support conveyor system 100 on the ground surface, as shown in FIG. 3. As shown in FIG. 3, proximal leg 12 may include one or more jacks 18, for instance a hydraulic telescoping jack, in various embodiments. Such jacks 18 may include or be coupled to one or more motors that serve to extend and or retract proximal leg 12.

Figure 4:
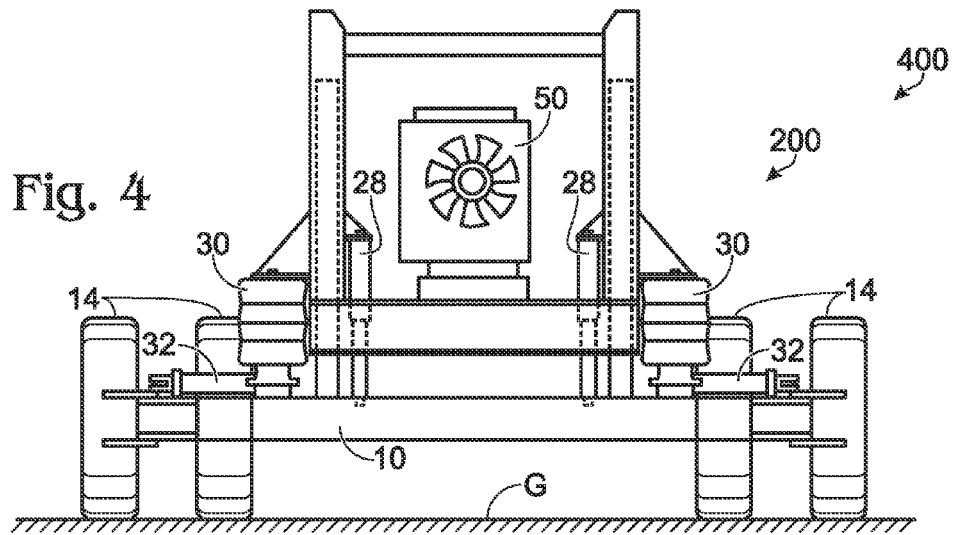
FIG. 4 is a partial view of the base assembly of FIG. 3, shown with an air bag in an inflated position and a shock absorber in an extension cycle, in accordance with various embodiments.
Figure 5:
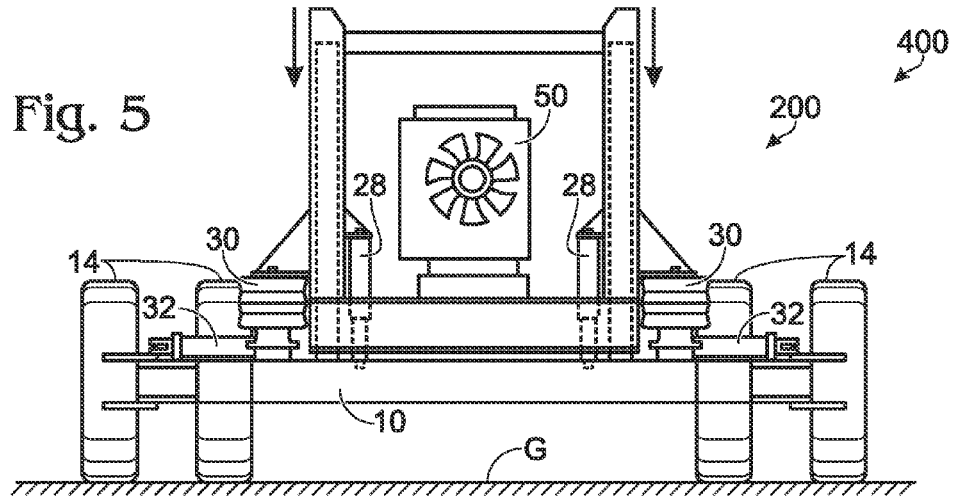
FIG. 5 is the base assembly of FIG. 4, shown with the air bag in a deflated position and a shock absorber in a compression cycle, in accordance with various embodiments.

In some embodiments, conveyor system 100 also may include a suspension system 400 configured to absorb shocks transmitted to support assembly 200 from the plurality of wheels 14. In some embodiments, suspension system 400 may include at least one shock absorber 28 and/or one or more airbag 30. For instance, FIG. 4 illustrates a partial view of support assembly 200, shown with an air bag 30 in an inflated position and a shock absorber 28 in an extension cycle, in accordance with various embodiments. FIG. 5 illustrates the same support assembly 200 with air bag 30 in a deflated position and a shock absorber 28 in a compression cycle. Such shock absorbers 28 and airbags 30 may absorb shocks transmitted to support assembly 200 from the plurality of wheels 14, for instance during use or during transport.

In various embodiments, conveyor assembly 300 may include any structure configured to transport material from feed inlet 20 to discharge outlet 22. In some embodiments, conveyor assembly 300 may include an elongate frame 34, end rolls 36, rollers (not shown), and a conveyor belt 38. Conveyor belt 38 typically moves in a direction from feed inlet 20 to discharge outlet 22 and may be made of any suitable material configured to flex and remain operatively connected to conveyor assembly 300 when all or a portion of conveyor assembly 300 is pivoted around plural axes, as further discussed below. Any suitable drive system may be used configured to move conveyor belt 38.

A pair of elongate skirt boards (not shown) may be mounted along elongate frame 34 in some embodiments. These skirt boards may have lower edges adjacent the upper belt run of conveyor belt 38, and may extend upwardly from the lower edges and incline outwardly to terminate in upper edges. In some embodiments, such skirt boards may help to maintain material suitable located over conveyor belt 38 as the material is carried forwardly by the belt.

In various embodiments, support assembly 200 may be configured to move conveyor assembly 300 between a storage or transport position in which conveyor assembly 300 is at least substantially horizontal (see, e.g., FIG. 1) and an operating position in which conveyor assembly 300 is inclined relative to the storage position (see, e.g., FIG. 2). In some embodiments, support assembly 200 may include at least one conveyor support member, for instance a strut 40, pivotally coupled to both conveyor assembly 300 and wheel 14. In various embodiments, conveyor support member 40 may be configured to pivot relative to conveyor assembly 300 and/or wheel 14 as conveyor assembly 300 moves between a storage or transport position and an operating position, for instance. In some embodiments, support assembly also may include one or more slidable support members, such as slidable struts 42.

In one example, as shown in FIGS. 1 and 2, slidable support member 42 may be pivotally attached to wheel 14 and slidably coupled to conveyor assembly 300 at 43 such that slidable support member 42 may be configured to slide along or relative to conveyor assembly 300 at 43 as conveyor assembly moves 300 between a storage or transport position and an operating position. Additional support members 44, 46 may couple to slidable support member 42, conveyor assembly 300, and/or base 10, and may help control the movement of slidable support member 42 and wheel 14 relative to conveyor assembly 300. Although support assembly 200 is illustrated to support conveyor assembly 300 from below, support assembly 200 may be configured to support conveyor assembly 300 from above or on the same plane in alternate embodiments. Moreover, although support assembly 200 is shown to support conveyor assembly 300 between feed inlet 20 and discharge outlet 22, conveyor assembly 300 may be supported in any suitable location and by any suitable structure.

In various embodiments, a pivoting connector assembly 52 may allow conveyor assembly 300 to fold back on itself by pivoting about a stowing axis B. For example, as illustrated in FIG. 1, pivoting connector assembly 52 may include a radial swinging or telescoping cylinder 54 connected to a lever 56, which may be coupled to conveyor assembly 300 and may be configured to pivot at least a portion of conveyor assembly 300 in any suitable range. Additionally, pivoting connector assembly 52 may be coupled to any suitable hydraulic system (not shown) or other drive system configured to selectively move telescoping cylinder 54, and thereby at least a portion of conveyor assembly 300. Thus, conveyor assembly 300 may be folded for storage or transport in some embodiments.

Some embodiments of the conveyor system 100 also may include a power source 50 such as a motor or generator, for instance for powering the conveyor system 100. In some examples, power source 50 may be a diesel power unit. In some examples, power source 50 may power one or more jacks or telescoping cylinders 18, 32, 54 in order to orient wheels 14, lift or lower conveyor assembly 300, or move conveyor assembly 300 between a storage or transport position and a working position.

Although the pivotal connections illustrated include hinges and rotary connections, any suitable pivotal connection configured to allow adjustable conveyor system 100 to pivot around plural axes may be used. Additionally, although the pivoting connector assemblies illustrated may include radial swinging or telescoping cylinders and drive systems, any suitable pivoting connector structure configured to allow conveyor system 100 to pivot around plural axes may be used. For example, rotary hydraulic cylinders, rotary pneumatic cylinders, servo motors, and rotary turntable systems may alternatively, or additionally, be used. Moreover, although the pivoting connector assemblies illustrated all have similar structures, any combination of similar or different structures may be used for the pivoting connector assemblies of the adjustable conveyor system. Furthermore, although several pivoting connector assemblies have been illustrated, the conveyor system 100 may have more or fewer assemblies configured to allow that system to pivot around plural axes, including the axes disclosed above.

As discussed above, in various embodiments, when conveyor system 100 needs to be moved or relocated, the system may be adjusted to an inoperative or travel position. First, conveyor assembly 300 may be pivoted to a lower position, such as is illustrated in FIG. 1. This may be accomplished by sliding slidable support member 42 along the longitudinal axis of the conveyor system 100 at 43 towards the feed inlet 20 end, which allows wheels 14 to roll along the same longitudinal access towards the feed inlet 20 end, lowering the discharge outlet 22 end towards the ground and returning conveyor assembly 300 to a substantially horizontal position. Next, conveying assembly 300 may be folded into an inoperative position by pivoting connector assembly 52, until the folded portion of conveyor assembly 300 comes to rest on stop 58. In various embodiments, the same procedure may be performed in reverse when it is desirable to move conveyor system 100 from a travel or inoperative position (see, e.g., FIG. 1) to an operating position (see, e.g., FIG. 2). However, in some embodiments, the steps discussed above may be performed in different sequences and in different combinations, not all steps being required for all embodiments of the conveyor system 100. In some embodiments, a locking mechanism (not shown) may be included to lock the system in the transport position and/or the operation position.

In some embodiments, conveyor system 100 may be supported at one end by a pivot 24, for instance when in use, by an extendable leg 26, for instance a hydraulic leg for positioning conveyor system 100 for transport, or by a vehicle (not shown) via hitch component 16 adjacent feed inlet 20, for instance for transport. In some embodiments, hitch component 16 may be connectable with a suitable hitch structure at the rear of a drawing vehicle or tractor, for instance to ready the vehicle for movement as a trailer over a road or highway. In other embodiments, conveyor system 100 may be supported by any suitable structure configured to enable the user to relocate or move conveyor system 100 to a desired location. For example, conveyor system 100 may be mounted on any mobile screening system, which may or may not be on a vehicle, and which may be wheeled or tracked.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A system for conveying material, comprising:
   a base assembly including a base, at least one base support member attached to and extending vertically from the base, a plurality of wheels rotatably connected to the base, and a suspension system configured to absorb shocks transmitted to the at least one base support member from the plurality of wheels, wherein the suspension system comprises a shock absorber and/or an airbag;
   a conveying assembly including a feed inlet and a discharge outlet, the conveying assembly configured to move the material from the feed inlet toward the discharge outlet; and
   a support assembly configured to move the conveying assembly between a storage position in which the conveying assembly is at least substantially horizontal, and an operating position in which the conveying assembly is inclined relative to the storage position, the support assembly including at least one conveyor support member attached to the conveying assembly and configured to overlap with the at least one base support member and to move relative to the at least one base support member, wherein the suspension system includes at least one air bag having a first end portion attached to the base and a second end portion attached to the at least one conveyor support member, wherein the at least one conveyor support member is configured to move relative to the at least one base support member between a proximal position and a distal position.

2. The system of claim 1, wherein the suspension system further includes at least one shock absorber having a first end portion attached to the base and a second end portion attached to the at least one conveyor support member.

3. The system of claim 1, wherein the base assembly includes at least one distal leg movably connected to the conveying assembly and spaced from the base, the at least one distal leg being configured to move between a lengthened position in which the at least one distal leg contacts the ground surface, and a shortened position in which the at least one distal leg does not contact the ground surface.

4. The system of claim 1, wherein the conveying assembly includes a first portion having the feed inlet, and a second portion having the discharge outlet and configured to move between a folded position in which the second portion is adjacent the first portion, and an unfolded position in which the second portion is spaced from the first portion.

5. The system of claim 4, wherein the conveying assembly further includes at least one hydraulic cylinder configured to move the second portion between the folded and unfolded positions.

6. A system for conveying material, comprising:
   a base assembly including a base, at least one proximal leg movably connected to the base, at least one base support member attached to and extending vertically from the base, and a plurality of wheels rotatably connected to the base and configured to move between a transport position in which the plurality of wheels is adjacent to the base, and a working position in which the plurality of wheels is spaced from the base relative to the transport position, wherein the at least one proximal leg is configured to move between a retracted position in which the plurality of wheels supports the system on a ground surface, and an extended position in which the at least one proximal leg supports the system on the ground surface and at least one wheel of the plurality of wheels does not support the system on the ground surface;

a conveying assembly including a feed inlet and a discharge outlet, the conveying assembly configured to move the material from the feed inlet toward the discharge outlet; and a support assembly configured to move the conveying assembly between a storage position in which the conveying assembly is at least substantially horizontal, and an operating position in which the conveying assembly is inclined relative to the storage position, the support assembly including at least one conveyor support member attached to the conveying assembly and configured to overlap with the at least one base support member and to move relative to the at least one base support member, wherein the base assembly further includes a suspension system configured to absorb shocks transmitted to the at least one base support member from the plurality of wheels, wherein the suspension system includes at least one air bag having a first end portion attached to the base and a second end portion attached to the at least one conveyor support member, wherein the at least one conveyor support member is configured to move relative to the at least one base support member between a proximal position and a distal position.

7. The system of claim 6, wherein the suspension system further includes at least one shock absorber having a first end portion attached to the base and a second end portion attached to the at least one conveyor support member.

* * * * *